United States Patent
Barthelemy

(10) Patent No.: US 9,261,235 B2
(45) Date of Patent: Feb. 16, 2016

(54) METHOD AND DEVICE FOR CONTROLLING THE PRESSURE IN A HYDROGEN TANK

(71) Applicant: L'Air Liquide Societe Anonyme pour l'Etude et l'Exploitation des Procedes Georges Claude, Paris (FR)

(72) Inventor: Hervé Barthelemy, Montevrain (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 294 days.

(21) Appl. No.: 13/956,892

(22) Filed: Aug. 1, 2013

(65) Prior Publication Data
US 2014/0034142 A1 Feb. 6, 2014

(30) Foreign Application Priority Data
Aug. 1, 2012 (FR) ...................... 12 57463

(51) Int. Cl.
*F17C 13/02* (2006.01)
*F17C 1/00* (2006.01)
*G05D 16/20* (2006.01)

(52) U.S. Cl.
CPC .............. *F17C 1/00* (2013.01); *G05D 16/2013* (2013.01); *F17C 2201/035* (2013.01);
(Continued)

(58) Field of Classification Search
CPC .................. F17C 1/00; F17C 2201/035; F17C 2201/054; F17C 2203/0643; F17C 2203/0648; F17C 2205/0332; F17C 2221/012; F17C 2223/0123; F17C 2223/036; F17C 2250/032; F17C 2250/0408; F17C 2250/043; F17C 2250/0439; F17C 2250/072; F17C 2260/042;
F17C 2270/0171; Y10T 137/6416; Y10T 137/0396; Y10T 137/0379; Y10T 137/7761; G05D 16/2013; Y02E 60/321
USPC ..................... 62/48.1, 53.2; 137/12, 14, 487.5
See application file for complete search history.

(56) References Cited

U.S. PATENT DOCUMENTS 3,041,841 A * 7/1962 Henry ................... F17C 13/126
137/209
5,582,016 A * 12/1996 Gier ................... A41D 13/0053
62/48.1

(Continued)

FOREIGN PATENT DOCUMENTS

EP 1990568 A1 11/2008
WO 2005038735 A1 4/2005

OTHER PUBLICATIONS
FR 1257463, FR Search Report & Written Opinion, Apr. 23, 2013.
(Continued)

Primary Examiner — William McCalister
(74) Attorney, Agent, or Firm — Elwood L. Haynes

(57) ABSTRACT

Method for controlling the pressure in a transportable cryogenic tank (1), especially a tank (1) mounted on a transportable platform (2) capable of being moved by a truck, the tank (1) being made of steel and containing pressurized liquid hydrogen, the method comprising at least one of the following: continuously or periodically measuring the temperature in the tank (1) and continuously or periodically measuring the level of the liquid in the tank and, when the measured temperature exceeds a set upper temperature threshold (Ts) lying between minus 140° C. and minus 160° C., and, respectively, when the liquid level in the tank drops below a set liquid level threshold, the pressure in the tank (1) is limited to a value less than or equal to a set pressure threshold (Pmax) lying between 1.5 and 3 bar.

12 Claims, 1 Drawing Sheet

(52) U.S. Cl.
CPC .. *F17C 2201/054* (2013.01); *F17C 2203/0643* (2013.01); *F17C 2203/0648* (2013.01); *F17C 2205/0332* (2013.01); *F17C 2221/012* (2013.01); *F17C 2223/0123* (2013.01); *F17C 2223/036* (2013.01); *F17C 2250/032* (2013.01); *F17C 2250/043* (2013.01); *F17C 2250/0408* (2013.01); *F17C 2250/0439* (2013.01); *F17C 2250/072* (2013.01); *F17C 2260/042* (2013.01); *F17C 2270/0171* (2013.01); *Y02E 60/321* (2013.01); *Y10T 137/0379* (2015.04); *Y10T 137/0396* (2015.04); *Y10T 137/6416* (2015.04); *Y10T 137/7761* (2015.04)

(56) References Cited

U.S. PATENT DOCUMENTS

| | | | |
|---|---|---|---|
| 8,413,951 B2 * | 4/2013 | Nomichi | F16K 31/0679 137/468 |
| 2004/0163731 A1 * | 8/2004 | Eichelberger | B60S 5/02 141/284 |
| 2005/0083198 A1 * | 4/2005 | Bulin | F17C 13/02 340/539.22 |
| 2005/0183425 A1 | 8/2005 | Immel | |
| 2009/0000406 A1 * | 1/2009 | Brazier | F16K 17/1626 73/865.8 |
| 2013/0082054 A1 * | 4/2013 | Groben | F15B 1/083 220/231 |

OTHER PUBLICATIONS

Barthelemy, H. and Pressouyre, G.M. "Hydrogen gas embrittlement of steels" Synthesis of the CEC hydrogen energy program (1975-1983).

Barthelemy, H. "Hydrogen gas embrittlement of some austenitic stainless steels", Hydrogen and Materials, Beijing May 9-13, 1988.

* cited by examiner

METHOD AND DEVICE FOR CONTROLLING THE PRESSURE IN A HYDROGEN TANK

FIELD OF THE INVENTION

The present invention relates to a method and device for controlling the pressure in a hydrogen tank.

SUMMARY OF THE INVENTION

The invention in particular relates to a method and device for controlling the pressure in a hydrogen tank in order to remove the risk of it being embrittled by the hydrogen and cracking.

The invention more particularly relates to a method for controlling the pressure in a transportable cryogenic tank, especially a tank mounted on a transportable platform capable of being moved by a truck, the tank being made of steel and containing a pressurized liquid hydrogen.

Hydrogen gas may embrittle stressed materials in certain temperature ranges (see, for example, the article by Barthelemy, H. and Pressouyre, G. M. "Hydrogen gas embrittlement of steels" Synthesis of the CEC hydrogen energy program (1975-1983)) and more particularly stainless steels (see the article by Barthelemy, H. "Hydrogen gas embrittlement of some austenitic stainless steels", Hydrogen and Materials, Beijing 9-13 May, 1988).

In particular, many stainless steels are weakened by hydrogen.

Liquid hydrogen is generally transported in (vacuum isolated) cryogenic tanks. These cryogenic tanks are for example mounted on semi-trailers. Such tanks are generally made from stainless steels. To remove the risk of embrittling the steel of the tank, it is therefore preferable to use a steel that is less prone to embrittlement (for example 316L stainless steel).

Another solution consists in using other constituent materials in production of the tank, for example 304L steel or 304N steel. Although these solutions result in lighter and/or less expensive tanks they are unacceptable because the operating conditions of the tank of the corresponding semi-trailer means that there is a risk of the tank being embrittled by hydrogen and cracking (see the second article cited above).

In addition, the pressure in the hydrogen tank tends to increase as it is emptied because the liquid hydrogen level drops.

One aim of the present invention is to overcome all or some of the aforementioned drawbacks of the prior art.

For this purpose, the method according to the invention, moreover according to the generic definition thereof given in the above preamble, is essentially characterized in that the method comprises at least one of the following: continuously or periodically measuring the temperature in the tank and continuously or periodically measuring the level of the liquid in the tank and, when the measured temperature exceeds a set upper temperature threshold lying between minus 140° C. and minus 160° C., and, respectively, when the liquid level in the tank drops below a set liquid level threshold, the pressure in the tank is limited to a value less than or equal to a set pressure threshold (Pmax) lying between 1.5 and 3 bar.

Moreover, embodiments of the invention may comprise one or more of the following features:
- the set liquid level threshold lies between 3% and 15% of the maximum liquid level in the tank;
- the method comprises both continuously or periodically measuring the temperature in the tank and continuously or periodically measuring the level of the liquid in the tank and, when the measured temperature exceeds a set upper temperature threshold lying between minus 140° C. and minus 160° C., and the liquid level in the tank drops below a set liquid level threshold, the pressure in the tank is limited to a value less than or equal to a set pressure threshold lying between 1.5 and 3 bar;
- the pressure in the tank is automatically limited to a value less than or equal to the set pressure threshold after delivery of liquid from the tank to one or more storage tanks;
- the set pressure threshold is equal to 2 bar;
- the upper temperature threshold is equal to minus 150° C.; and/or
- the tank is made from one at least of the following steels: 321, 204, 302, 304 and 304L steels or nitrogen-stabilised steels such as 204N, 302N and 304N steels.

The invention may also relate to a device for delivering liquid hydrogen comprising a tank mounted on a transportable platform capable of being moved by a truck, the tank being made of steel and containing pressurized liquid hydrogen, the tank comprising a temperature sensor located in the upper part of the tank, a pressure sensor, a member for selectively venting gas to the exterior of the tank, and an electronic control system connected to the temperature sensor, to the pressure sensor and to the member for selectively venting gas, the electronic control system being configured to automatically vent gas out of the tank and to limit the pressure in the tank to a set pressure threshold lying between 1.5 and 3 bar as soon as the measured temperature exceeds a set upper temperature threshold lying between minus 140° C. and minus 160° C.

According to other possible particularities:
- the selective venting member comprises at least one of the following: an overflow system, a valve;
- the tank comprises a liquid level sensor in the tank, said liquid level sensor being connected to the electronic control system; and/or
- the tank is made of at least one of the following steels: 321, 204, 302, 304 and 304L steels or nitrogen-stabilized steels such as 204N, 302N and 304N steels.

The invention may also relate to any alternative device or method comprising any combination of the features above or below.

BRIEF DESCRIPTION OF THE FIGURES

Other particularities and advantages will become apparent on reading the following description given with reference to the appended figures in which.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

Figure 1:
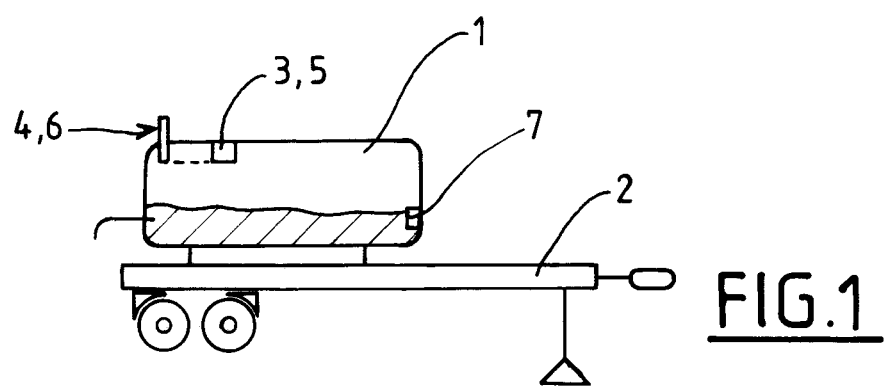
FIG. 1 shows a partial schematic of an example of a device for implementing the invention.

The device for delivering liquid hydrogen shown in FIG. 1 comprises a tank 1 mounted on a transportable platform 2 capable of being moved by a truck. The tank 1 is made of stainless steel and contains pressurized liquid hydrogen. More precisely, the tank 1 may consist of a steel subject to embrittlement when brought into contact with hydrogen gas, for example a steel such as 304N steel, or other unstable stainless steels (such as, for example, 321, 204, 302, 304 or 304L steels) or nitrogen-stabilized steels (such as 204N, 302N or 304N steels etc.).

To prevent embrittlement which could cause the tank 1 to crack and a serious accident, the device comprises a system for regulating the pressure in the tank 1.

Thus, the tank 1 comprises a temperature sensor 3 preferably located in the upper part of the tank 1. The temperature sensor 3 is for example a thermocouple or any other appropriate member.

The tank 1 also comprises a member 4 for selectively venting gas to the exterior of the tank, for example a valve, an overflow system, or any other appropriate equivalent member allowing the pressure in the tank 1 to be selectively lowered. The tank may also comprise a pressure sensor 6.

Figure 2:
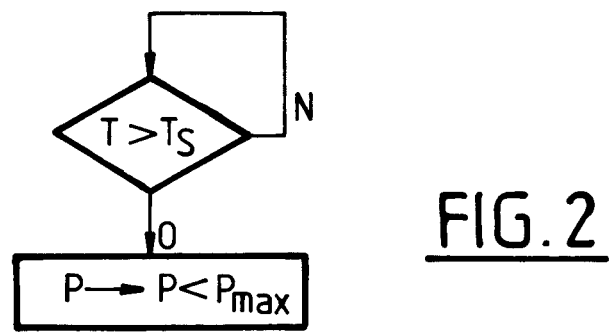
FIG. 2 shows a partial schematic of example steps that could be implemented in the invention.

The tank 1 furthermore comprises an electronic control system 5 connected to the temperature sensor 3, to the pressure sensor 6 and to the member 4 for selectively venting gas. This electronic control system 5 is configured to automatically vent gas out of the tank 1 in order to reduce the pressure in the tank 1 to a set pressure threshold Pmax lying between 1.5 and 3 bar and preferably equal to 2 bar as soon as the temperature T measured by the sensor 4 exceeds a set upper temperature threshold Ts lying between minus 140° C. and minus 160° C. and preferably equal to minus 150° C. (see FIG. 2).

This measure allows the risk of the tank 1 becoming embrittled to be very greatly reduced.

The invention in particular makes it possible to guarantee that the constituent steel of the tank is subjected to a pressure range in which it is less liable to become brittle due to its exposure to hydrogen.

This allows tanks made of relatively inexpensive steel, furthermore allowing the weight of the tank to be reduced, to be used to transport hydrogen without however risking embrittlement of the tank.

What is claimed is:

1. A method for controlling the pressure in a transportable cryogenic tank, wherein the tank is mounted on a transportable platform capable of being moved by a truck, the tank material is steel and the tank containing pressurized liquid hydrogen, the method comprising: continuously or periodically measuring the temperature in the tank and, when the measured temperature exceeds a set upper temperature threshold, the set upper temperature threshold being between minus 140° C. and minus 160° C., the pressure in the tank is limited to a value less than or equal to a set pressure threshold, the set pressure threshold being between 1.5 and 3 bar.

2. The method of claim 1, further comprising continuously or periodically measuring the level of the liquid in the tank and, when the liquid level in the tank drops below a set liquid level threshold, the pressure in the tank is limited to a value less than or equal to a set pressure threshold between 1.5 and 3 bar.

3. The method of claim 2, wherein the set liquid level threshold lies between 3% and 15% of the maximum liquid level in the tank.

4. The method of claim 2, further comprising both continuously or periodically measuring the temperature in the tank and continuously or periodically measuring the level of the liquid in the tank and, when the measured temperature exceeds a set upper temperature threshold between minus 140° C. and minus 160° C., and the liquid level in the tank drops below a set liquid level threshold, the pressure in the tank is limited to a value less than or equal to a set pressure threshold between 1.5 and 3 bar.

5. The method of claim 1, wherein the pressure in the tank is automatically limited to a value less than or equal to the set pressure threshold after delivery of liquid from the tank to one or more storage tanks.

6. The method of claim 1, wherein the set pressure threshold is equal to 2 bar.

7. The method of claim 1, wherein the upper temperature threshold is equal to minus 150° C.

8. The method of claim 1, wherein the tank is made from one at least of the following steels: 321, 204, 302, 304, 304L steels or nitrogen-stabilized steel.

9. A device for delivering liquid hydrogen comprising a tank mounted on a transportable platform capable of being moved by a truck, the tank being made of steel and containing a pressurized liquid hydrogen, the tank comprising a temperature sensor located in the upper part of the tank, a pressure sensor, a member for selectively venting gas to the exterior of the tank, and an electronic control system connected to the temperature sensor, to the pressure sensor and to the member for selectively venting gas, the electronic control system being configured to automatically vent gas out of the tank and to limit the pressure in the tank to a set pressure threshold between 1.5 and 3 bar as soon as the measured temperature exceeds a set upper temperature threshold between minus 140° C. and minus 160° C.

10. The device of claim 9, wherein the selective venting member comprises at least one of the following: an overflow system, a valve.

11. The device of claim 9, wherein the tank comprises a liquid level sensor in the tank, said liquid level sensor being connected to the electronic control system.

12. The device of claim 9, wherein the tank is made of at least one of the following steels: 321, 204, 302, 304, 304L steels or nitrogen-stabilized steel.

* * * * *